United States Patent
Jolly

(10) Patent No.: US 7,579,549 B2
(45) Date of Patent: Aug. 25, 2009

(54) PROTECTIVE DEVICE PLATE FOR AN ELECTRICAL BOX

(75) Inventor: Robert K. Jolly, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 12/151,005

(22) Filed: May 2, 2008

(65) Prior Publication Data

US 2008/0277134 A1    Nov. 13, 2008

Related U.S. Application Data

(60) Provisional application No. 60/928,832, filed on May 11, 2007.

(51) Int. Cl.
*H02G 3/14* (2006.01)
(52) U.S. Cl. .............................. 174/66; 174/67; 174/58; 174/50; 174/53; 220/241; 439/136
(58) Field of Classification Search .................. 174/66, 174/67, 58, 53, 50; 220/241, 242; 439/136, 439/147, 142, 535; 248/906; 33/528
See application file for complete search history.

(56) References Cited

U.S. PATENT DOCUMENTS

| | | | | |
|---|---|---|---|---|
| 5,064,969 A | * | 11/1991 | Bloom | 174/67 |
| 5,264,662 A | * | 11/1993 | Kennedy | 174/67 |
| 6,215,067 B1 | * | 4/2001 | Chen | 174/66 |
| 6,417,450 B1 | * | 7/2002 | Young | 174/66 |
| 6,765,149 B1 | * | 7/2004 | Ku | 174/66 |
| 6,835,890 B2 | * | 12/2004 | Dinh et al. | 174/66 |
| 6,943,297 B2 | * | 9/2005 | Capella | 174/66 |
| 7,193,160 B2 | * | 3/2007 | Dinh | 174/483 |
| 7,247,794 B1 | * | 7/2007 | Johnson et al. | 174/66 |

* cited by examiner

*Primary Examiner*—Dhiru R Patel
(74) *Attorney, Agent, or Firm*—Hoffmann & Baron, LLP

(57) ABSTRACT

A cover for an electrical box having a face plate, an elongate slot in the face plate, a lid support structure and a lid. The lid fits on the front of the face plate and over the opening and is pivotably movable between an open position, which allows access to the box interior, and a closed position, which prevents access to the box interior. When in the open position, the lid is slidably receivable by the slot and is stored in the lid support structure that extends from the back of the cover.

20 Claims, 11 Drawing Sheets

PROTECTIVE DEVICE PLATE FOR AN ELECTRICAL BOX

This application claims priority from provisional application Ser. No. 60/928,832, filed on May 11, 2007, which is incorporated herein in its entirety.

FIELD OF THE INVENTION

This invention relates to a cover for an electrical box with a hide-away lid that is concealed within a floor, wall or ceiling so that it is protected from exposure to damage. In particular, the invention relates to a lid that pivotally opens and then slides into a lid support structure located next to the side wall of the electrical box.

BACKGROUND OF THE INVENTION

Electrical receptacle boxes installed in a ceiling, a wall or a floor according to a particular need are well known. In general, electrical devices, such as switches and receptacles, are required by electrical codes to be installed in an electrical box. To cover the exposed wiring connections within the box and to give the installation a finished appearance, a cover plate is installed over the electrical device after it is installed in the box. Typically, the cover plate has an opening for accessing the electrical device (e.g., a receptacle or switch) in the electrical box and one or more apertures for attaching the cover plate to the electrical device or box. However, the cover plate does not typically cover the entire electrical device and, in the case of a receptacle, the apertures for receiving an electrical plug remains exposed. While some covers currently in use have hinged lids that completely cover the electrical device when in the closed position, the lids are unprotected and exposed to damage when the cover is in the open position. Moreover, if inadvertently closed, the lid can damage electrical cords connected to the electrical device.

Accordingly, there is a need for an electrical box cover with a lid that protects an electrical receptacle or connector mounted in an electrical box when in the closed position and that does not interfere with access to the box or is not subject to being damaged when in the open position. Moreover, the cover and lid must be suitable for use with electrical boxes mounted in a floor, wall or ceiling. There is also a need for a lid that is integrated with the cover so that it is not easily separated from the cover and does not interfere with accessing the electrical device when in a fully open position.

SUMMARY OF THE INVENTION

The present invention is a cover for an electrical box that includes one or more lids (also referred to herein as hide-away lids). The cover is used with electrical boxes that typically have a back wall, an open front and a perimeter side wall extending therebetween to define a box interior which is adapted to receive one or more electrical devices. The cover includes at least: a face plate, an elongate slot in the face plate, a lid support structure and a lid. The face plate has a front, a back and an opening with a plurality of sides; preferably four sides. The elongate slot in the face plate is substantially parallel to and extends along one side of the opening. The slot has a pair of opposing sides and a pair of opposing ends. The lid support structure extends from the back of the face plate proximate the slot; preferably, substantially perpendicular to the face plate.

The lid includes a first end, a second end and a pair of opposing sides. The lid fits on the front of the face plate and over the opening and is pivotably movable between an open position, which allows access to the box interior, and a closed position, which prevents access to the box interior. The lid is slidably receivable by the slot when in the open position. The lid can also have pins on the opposing sides, which are slidably received by the channels. When the lid is retracted from the slot, it pivots on the pins between the open and closed positions.

The lid support structure can include a pair of tracks located at the opposing ends of the slot. Preferably, these tracks are a pair of channels and each channel has a closed end formed by the face plate and an open end. The lid support structure can also include a plurality of retainers, preferably two retainers, located on the opposing sides of the slot. Preferably, the two retainers each have a terminus formed by a tab. The tabs face each other and limit the movement of the lid in the support structure. In another embodiment, the lid support structure includes two tracks at the opposing ends of the slot which receive the lid when it is retracted into the cover. The tracks extend from the cover to an open end and a member extends across the open end to limit the travel of the lid in the tracks.

The face plate has a surface and can have a recessed ledge in the surface on at least two sides of the opening. The lid contacts the recessed ledge when in the closed position. The first end of the lid can have a latching device that engages the side of the opening in the face plate opposite the slot. The second end of the lid is slidably receivable by the slot when the lid is in the fully open position.

In another embodiment, the cover includes two or more lids. Each of the lids operates in the same manner and includes similar components, i.e., similar elongate slots, lid support structures, openings, and latching mechanisms as the single lid cover described above. These covers are used with electrical boxes that contain two or more electrical devices. The lids operate independently to selectively allow access to one or more of the electrical devices.

DETAILED DESCRIPTION OF THE PREFERRED EMBODIMENT

Figure 1:
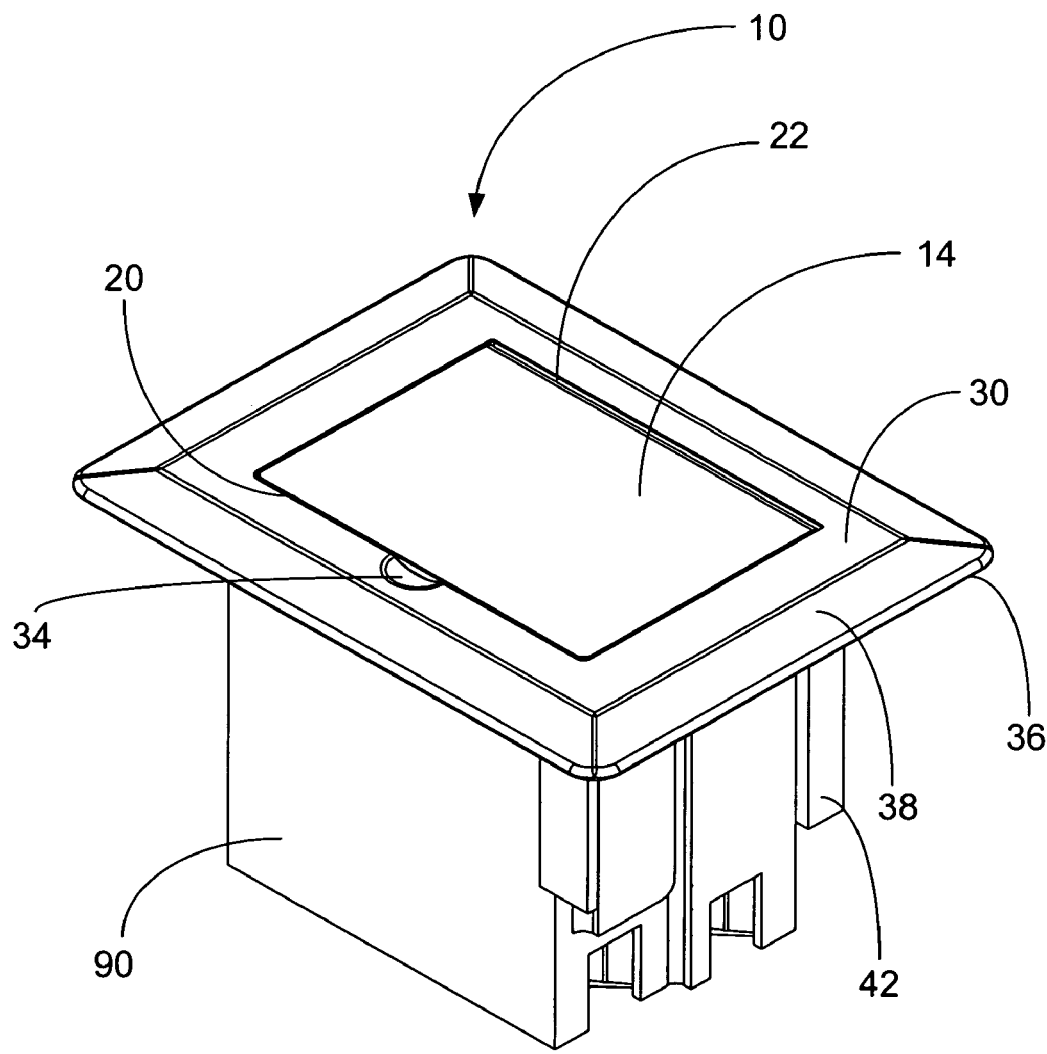
FIG. 1 is a front perspective view of a first embodiment of the cover mounted on an electrical box with the hide-away lid in the closed position.

The present invention is a cover for an electrical box with one or more hide-away lids. The hide-away lids can be retracted below the surface of the face plate of the cover when in the fully open position. The cover can be used with a standard electrical box or it can be integrally molded to a box that has a perimeter side wall extending between a back wall and an open front to define a box interior. Different size boxes with different configurations for housing one or more electrical devices can be used with the cover. Depending on the type of electrical box and the number of electrical devices, the cover can include one or more hide-away lids.

In a preferred embodiment, the cover includes: a face plate, an elongate slot in the face plate, a lid support structure and a lid. The face plate has a front, a back and an opening with a plurality of sides. Typically, the face plate is substantially flat and has a rectangular shape with sloping side walls that extend downwardly to a perimetrical edge. However, the face plate can also have other shapes and the invention is not limited by the shape of the face plate. The elongate slot in the face plate is substantially parallel to and extends along one side of the opening. Preferably, there is a ledge on at least two sides of the opening that is recessed from the surface of the face plate. The ledge extends outwardly from the face plate into the opening and the slot is located on this ledge. The slot is about as long as the opening and as wide as the thickness of the lid that fits over the opening. The slot has a pair of opposing sides that extend substantially parallel to the opening and a pair of opposing ends.

The lid support structure extends from the back of the face plate proximate the slot on at least two sides or two ends of the slot. Preferably, the lid support structure is substantially perpendicular to the back of the face plate so that, when the cover is attached to an electrical box, the lid support structure is substantially parallel to the side wall of the box. The lid includes a first end, a second end and a pair of opposing sides. The lid fits on the front of the face plate and over the opening with the first end opposite the slot and the second end next to the slot. The lid is pivotably movable between an open position, which allows access to the box interior, and a closed position, which prevents access to the box interior. When the lid is in the open position, it is slidably receivable by the slot and the first end of the lid is even with or below the surface of the face plate.

The lid support structure can include two retainers, each having a terminus formed by a tab. The tabs face each other and limit the movement of the lid when the lid is in the fully retracted position. Preferably, the lid support structure includes a pair of tracks located at the opposing ends of the slot. The tracks receive the opposing sides of the lid and maintain the alignment of the lid as it is retracted into the lid support structure. Each of the tracks can have a stop that extends into the open end of the track to limit the movement of the lid in the track. The stops are preferably flexible so that they can be biased outwardly to clear the tracks. This allows the lid to pass through the open ends of the tracks and be removed from the cover. In the same manner, a lid can be installed in the cover by pushing back the stops and inserting the lid in the tracks. After the lid passes the open ends of the tracks, the stops are released and move back into the open ends of the tracks to retain the lid in the lid support structure.

In one embodiment, each track is a "U-shaped" channel that extends from a closed end formed by the face plate to an open end. The channels slidably receive a pin on the opposing sides of the lid near the second end. The pins and channels not only guide the lid, but they are also used to limit the travel of the lid when it is withdrawn from the lid support structure. When the pins on the lid reach the closed ends of the channels, the lid can be withdrawn no further (the pins act as stops). Hence, the lid is in the fully open position and can be closed by pivotably rotating the lid over the opening in the cover.

The lid support structure can also include two retainers located on the opposing sides of the slot. The retainers maintain the alignment of the lid as it is retracted into the lid support structure and also protect the lid from insulation, wiring or other objects that may interfere with the movement of the lid. Preferably, the two retainers each have a terminus formed by a tab that extends under the slot. The tabs face each other and limit the movement of the lid in the support structure.

In preferred embodiments, the center portion of the face plate has a substantially flat surface and a side wall that slopes downwardly to a perimetrical edge. The face plate can have a recessed ledge in the surface that extends inwardly on at least two sides of the opening. In some embodiments, the ledge extends around the entire opening. When in the closed position, the lid contacts the recessed ledge(s) and the top surface of the lid is substantially flush with the surface of the face plate.

The first end of the lid can have a latching device that engages the edge of the opening in the face plate opposite the slot. Preferably, the first end of the lid has a protrusion that compressively contacts a latching mechanism on the side of the opening. When the lid is closed, it snaps into the latching mechanism and is held in position until a force is applied to the latching mechanism to release the lid. The first end of the lid next to the latching mechanism can also have a finger grip that facilitates moving the lid back and forth between the closed and the open position. The second end of the lid is parallel to the slot in the cover and, when the lid is in the fully open position, the second end is slidably receivable by the slot.

In another embodiment, the cover includes: a face plate, two or more elongate slots in the face plate, two or more lid support structures for each of the slots and two or more lids. This embodiment is similar to the first embodiment except that the cover has two or more lids instead of a single lid. All of the other features of the cover and lid of the first embodiment are substantially the same and function in substantially the same manner.

Figure 2:
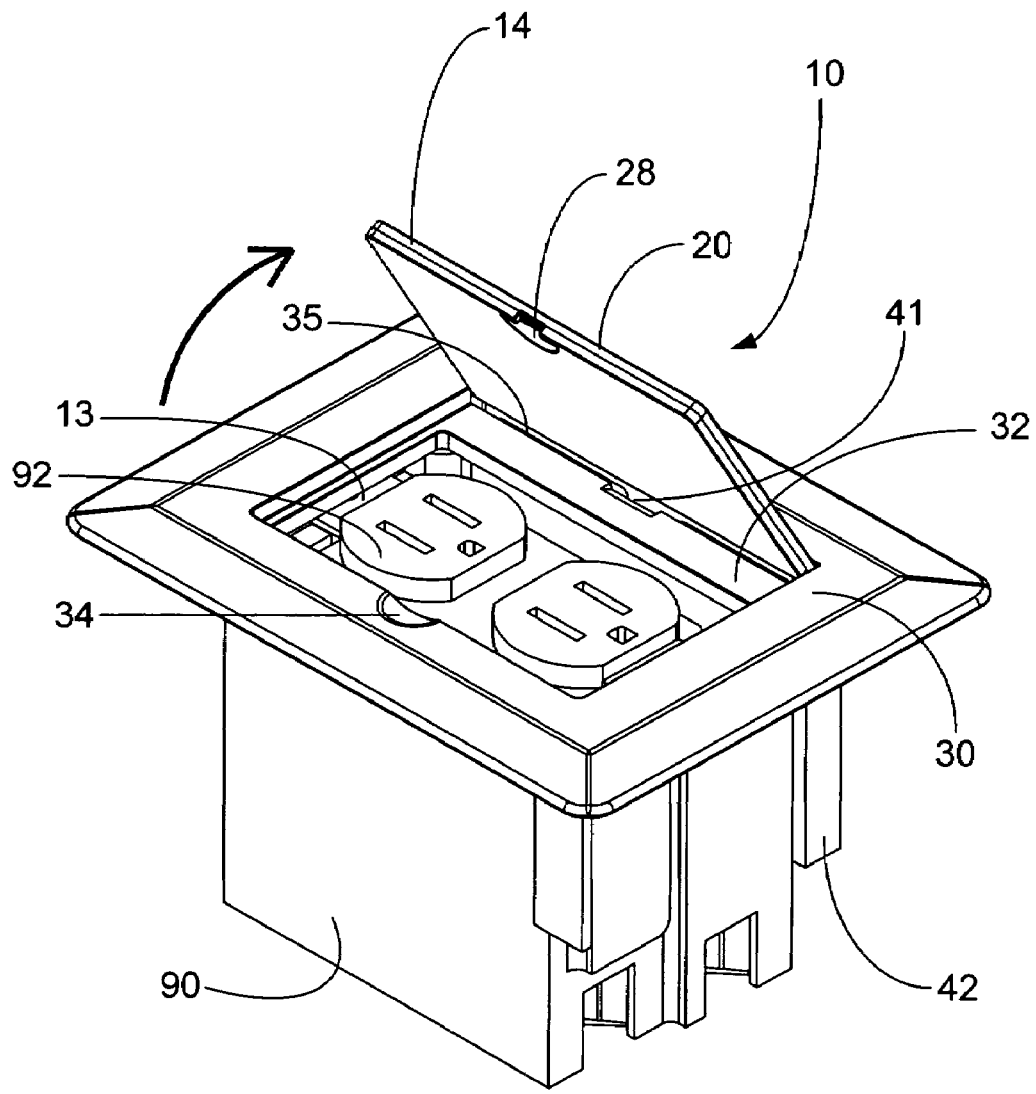
FIG. 2 is a front perspective view of the cover in FIG. 1 with the hide-away lid in the partially open position.

Referring to the drawings, FIGS. 1-5 show the first embodiment of the cover 10 mounted on an electrical box 90. The electrical box 90 is a generally rectangular box having four side walls and a back wall with an open top defining a box interior. FIG. 1 shows the cover 10 having a face plate 30 and side walls 38 extending downwardly from the face plate 30 to a perimetrical edge 36. The lid 14 is in the fully closed position which prevents access to the interior of the box 90. FIG. 2 shows the lid 14 partially open with a receptacle 92 mounted inside the electrical box 90. The first end 20 of the lid 14 has a centrally located recessed portion 28 that functions in cooperation with a correspondingly located indentation 34 in the face plate 30 to allow a user to easily grasp the closed lid 14 (FIG. 1). FIG. 2 also shows a recessed ledge 32 in the opening 13 with a slot 35 in the ledge 32 on the hinged side of the lid 14.

Figure 3:
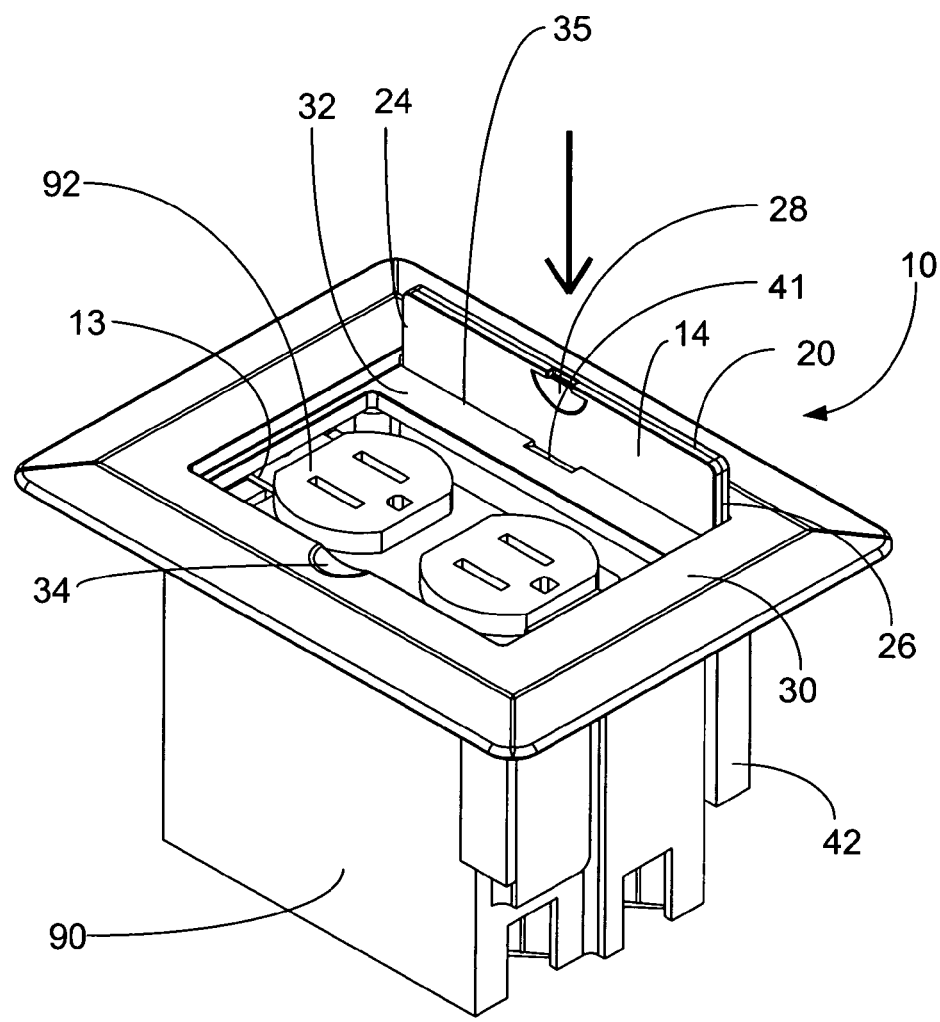
FIG. 3 is a front perspective view of the cover in FIG. 1 with the hide-away lid in the partially retracted position.
Figure 7:
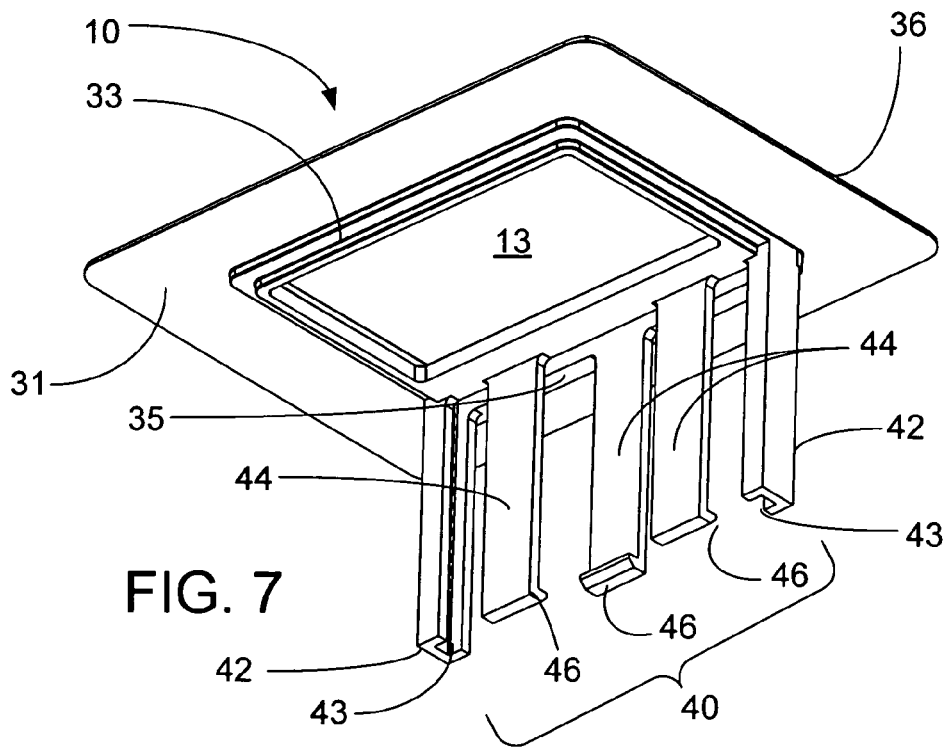
FIG. 7 is a rear perspective view of the first embodiment of the cover with the hide-away lid removed.

FIG. 3 shows the cover 10 with the lid 14 partially retracted into the slot 35 that extends along one side of the opening 13 in the face plate 30. The sides 24, 26 of the lid 14 are received by tracks 42 (only one shown) on either side that are part of the lid support structure 40 (FIG. 7). The lid 14 is substantially parallel to the side wall of the electrical box 90 as it is retracted into the slot 35.

Figure 4:
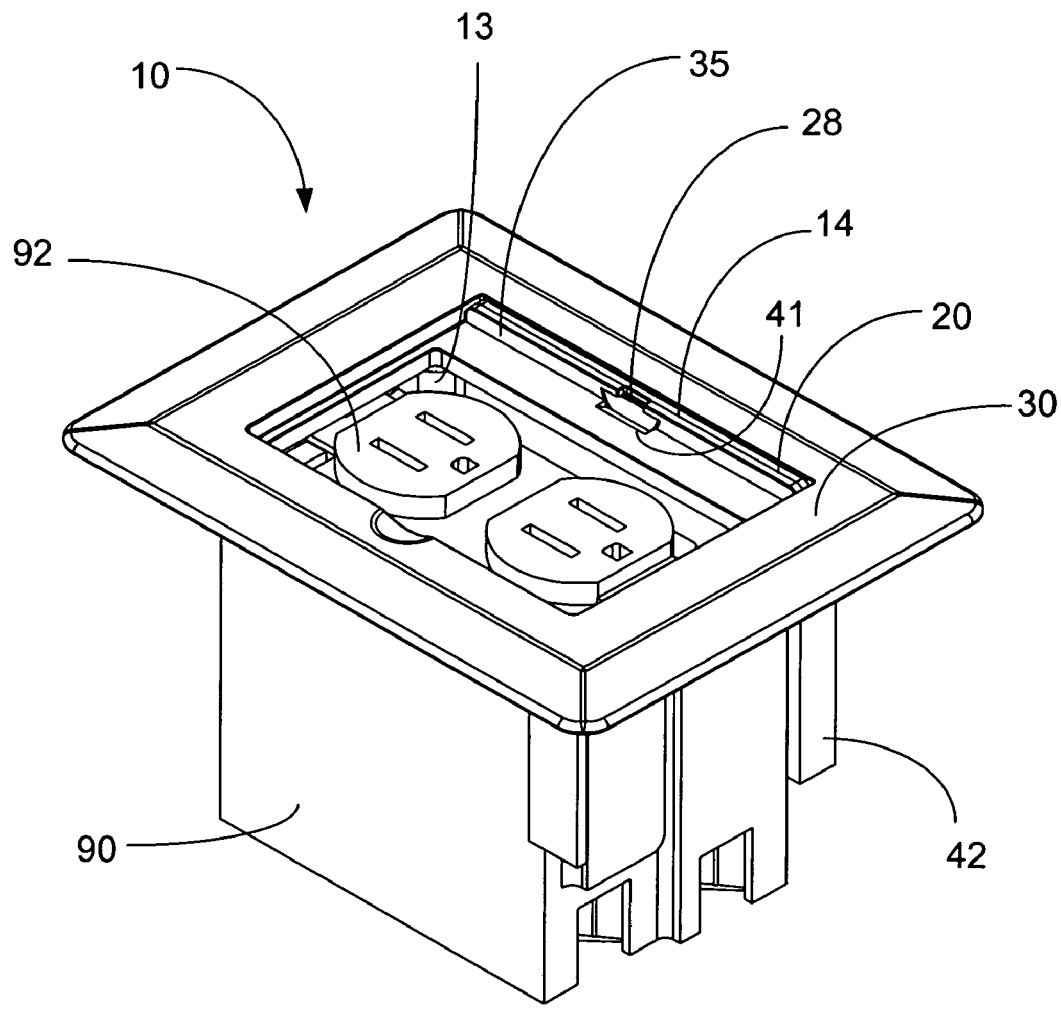
FIG. 4 is a front perspective view of the cover in FIG. 1 with the hide-away lid in the fully retracted position.
Figure 8:
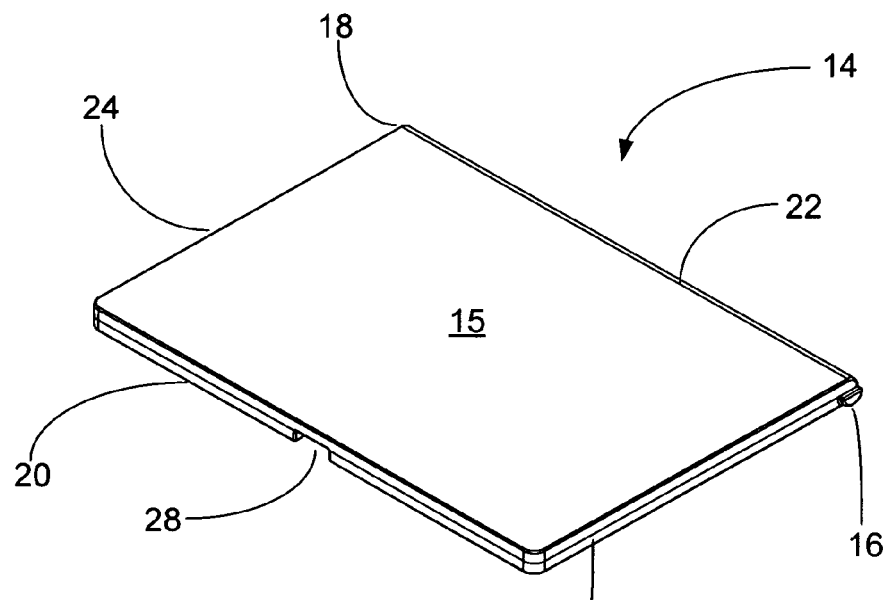
FIG. 8 is a top perspective view of the lid of the first embodiment of the cover.

FIG. 4 shows the cover 10 with the lid 14 fully retracted into the slot 35 so that the first end 20 of the lid 14 is even with or below the surface of the face plate 30. In this position, the lid 14 does not interfere with access to the electrical receptacle 92 in the electrical box 90. In addition, the lid 14 is protected from being damaged when it is in the fully retracted position. FIG. 4 also shows that the ledge 32 has a notch 41 that is aligned with the recessed portion 28 in the lid 14. This notch 41 allows the user to easily grasp the lid 14 and withdraw it from the slot 35. The lid 14 has a pair of pins 16, 18 on the opposing sides 24, 26 (FIG. 8). When the lid 14 is withdrawn from the slot 35 and the second end 22 of the lid 14 is about at the same level as the ledge 32 in the face plate 12, the lid 14 can be pivotably moved over the opening 13 in the face plate 30 and into the closed position (FIG. 1)

Figure 5:
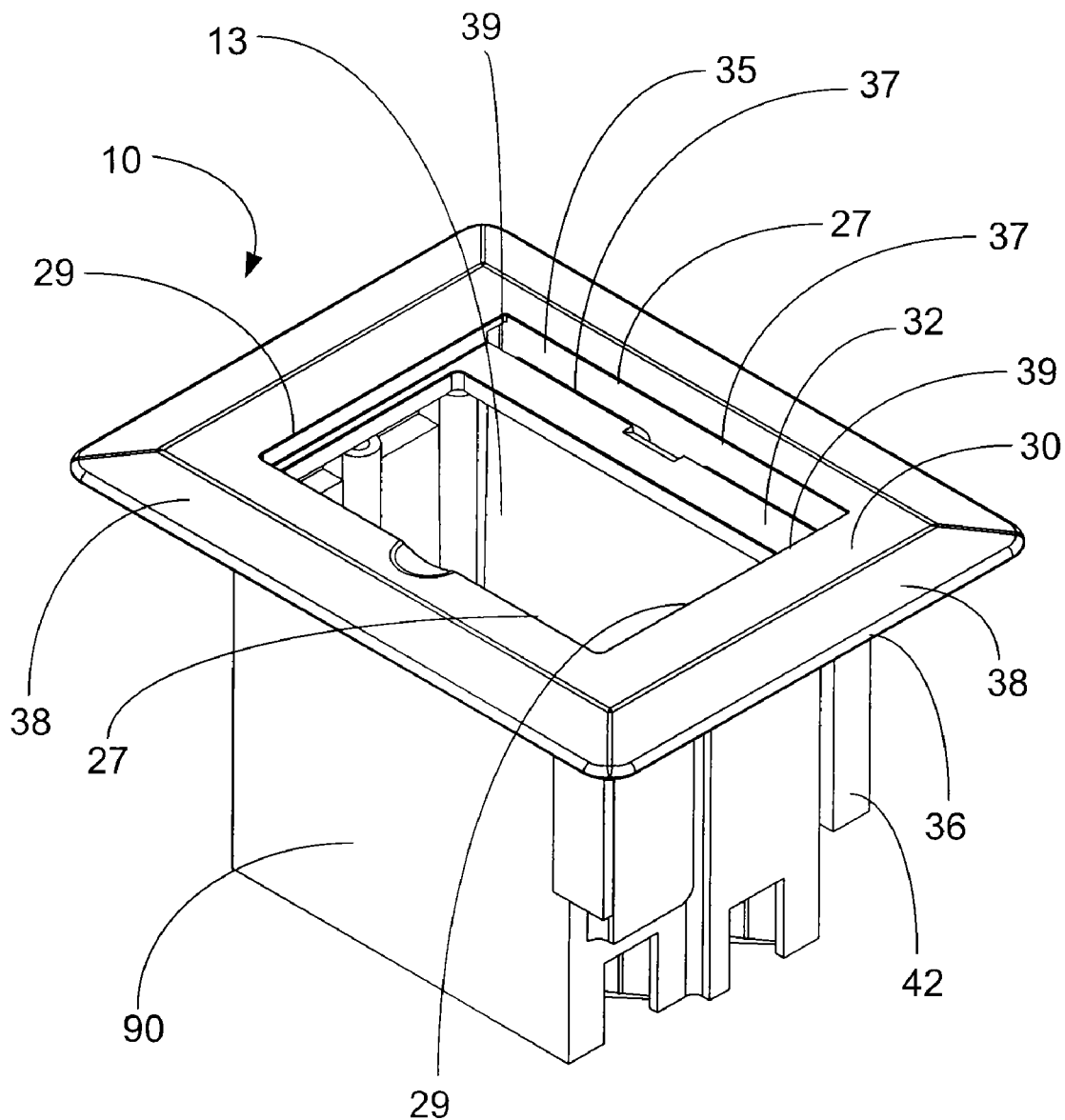
FIG. 5 is a front perspective view of the cover in FIG. 4 with the lid removed.

FIG. 5 shows the cover 10 with the lid 14 removed. This figure illustrates how the opening 13 in the face plate 30 permits unrestricted access to the interior of the electrical box 90. The opening 13 has a pair of opposing sides 27 and a pair of opening ends 29. This figure also illustrates how the recessed ledge 32 around the opening 13 extends inwardly from the face plate 30 and provides a support surface for the lid 14 when it is in a fully closed position (FIG. 1). The ledge 32 on one side 27 of the opening 13 has a slot 35 with a pair of opposing sides 37 and a pair of opposing ends 39 that extends parallel to one side of the opening 27 in the face plate 30. The face plate 30 has a side wall 38 that extends downwardly at an angle to a perimetrical edge 36. When the cover 10 is attached to an electrical box 90 with the front of the box 90 flush with a wall (not shown), the perimetrical edge 36 contacts the wall and the raised face plate 30 and the surface of the lid 14 are substantially coplanar.

Figure 6:
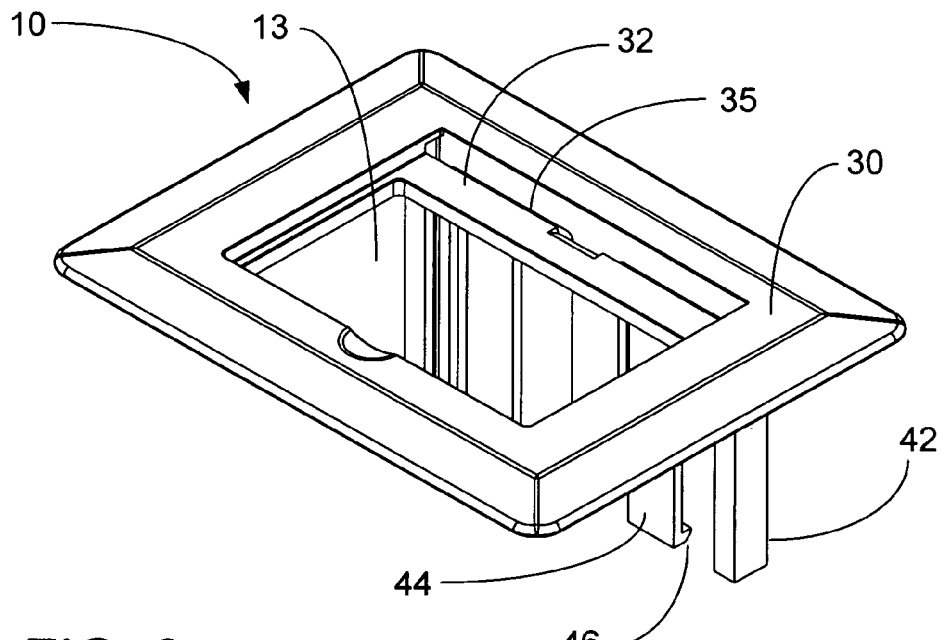
FIG. 6 is a front perspective view of the first embodiment of the cover with the hide-away lid removed.

FIGS. 6 and 7 show the cover 10 with the lid 14 removed. FIG. 6 is a front perspective view of the cover 10 and illustrates the relationship between the opening 13, the slot 35 and the lid support structure 40 (FIG. 7). FIG. 7 is a rear perspective view of the cover 10 and shows the lid support structure 40, which is formed by a pair of tracks 42 on opposing ends of the slot 35 and three retainers 44. Each of the three retainers 44 extend from the back surface 31 of the face plate 30 to a terminus formed by a tab 46 that extends inwardly towards the slot 35. The retainers 42 guide and protect the lid 14 as it is retracted into the lid support structure 40 and the tabs 46 limit the travel of the lid 14 so that it remains in the support structure 40 and does not become detached from the cover 10. The retainers 44 are preferably flexible so that they can be moved outwardly to allow the lid 14 to be removed from the cover 10. In a similar manner, the retainers 44 can be moved apart to allow a lid 14 to be installed in the cover 10. FIGS. 6 and 7 show an embodiment of the cover 10 in which each of the tracks 42 has a channel 43 extending along its length for receiving the sides 24, 26 of the lid 14 (FIG. 8). The back surface 31 of the cover 10 also has a lip 33 extending around the opening 13. When the cover 10 is installed on an electrical box 90, the lip 33 snugly fits against the interior surface of the side walls of the box 90 (FIG. 1).

Figure 9:
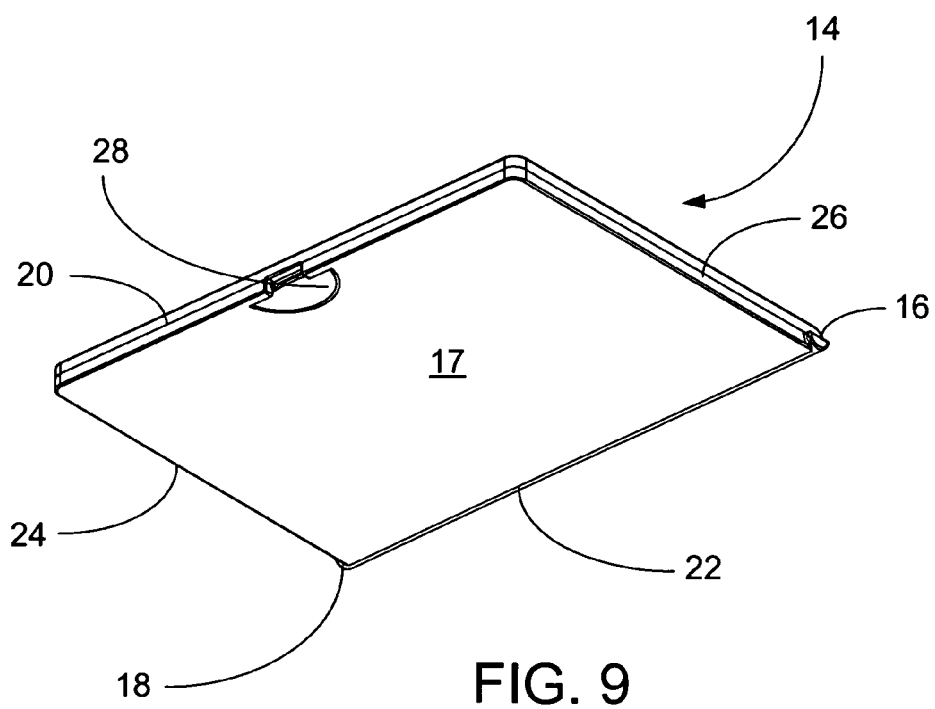
FIG. 9 is a bottom perspective view of the lid of the first embodiment of the cover.

FIGS. 8 and 9 show a top and bottom perspective view of the lid 14, respectively. In FIG. 8, the front surface 15 of the substantially planar lid 14 is shown having a first end 20, a second end 22, two opposing sides 24, 26 and a pair of pins 16, 18 extending outwardly from the opposing sides 24, 26 near the second end 22. FIG. 9 shows the back surface 17 of the lid 14. When the lid 14 is withdrawn from the lid support structure 40 (FIG. 7), the pins 16, 18 on the side walls 24, 26 contact the cover 10 and limit the travel of the lid 14.

Figure 10:
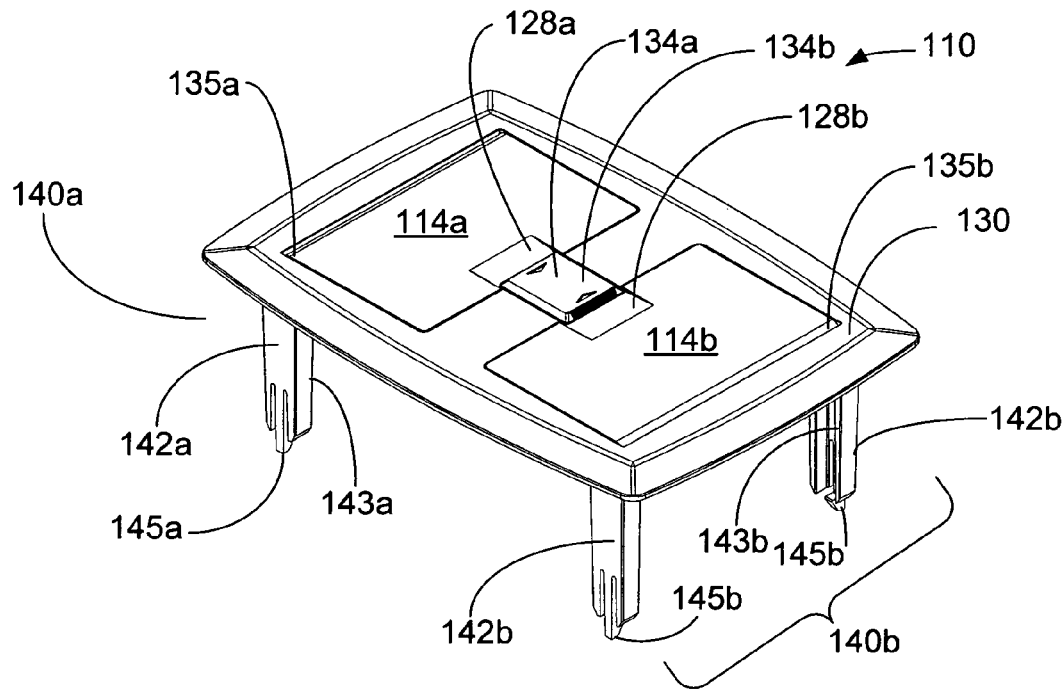
FIG. 10 is a front perspective view of a second embodiment of the cover having two hide-away lids in the closed position.
Figure 11:
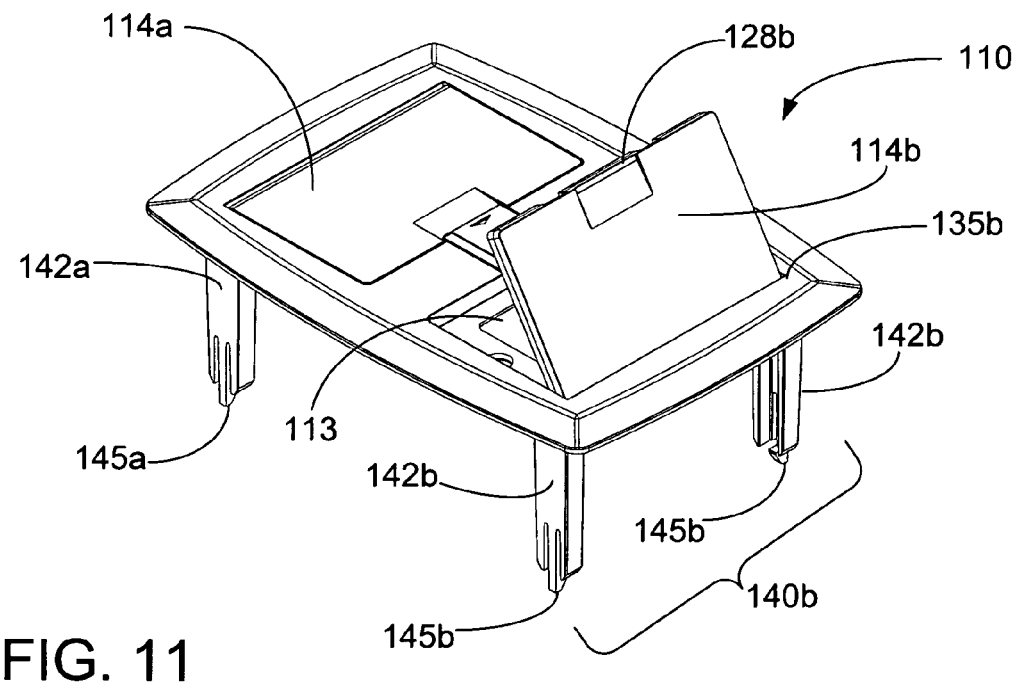
FIG. 11 is a front perspective view of the cover in FIG. 10 with one of the hide-away lids in the partially open position.

FIGS. 10-17 show a second embodiment of the invention which is a dual lid cover 110, which has two lids 114a, 114b in the face plate 130. The lids 114a, 114b in this embodiment operate in substantially the same manner as the lid 14 in the first embodiment (FIGS. 1-9). However, the number of lids 114a, 114b, the lid support structure 140 and the latching of the lid 114a, 114b are different as will be explained below. FIG. 10 shows the dual lid cover 110 with both lids 114a, 114b in the closed position. The lids 114a, 114b are secured in the closed position by latching mechanisms 134a, 134b on the face plate 130 and catches 128a, 128b on the lids 114a, 114b. Each of the catches 128a, 128b can be a protrusion or flexible member on the edge of the lid 114a, 114b that is engaged by the latching mechanisms 134a, 134b. Pushing down on the lids 114a, 114b, snaps them into a closed position (FIG. 10) and pushing down on the latching mechanisms 134a, 134b releases the lids 114a, 114b (FIG. 11). Of course, other latching mechanisms may operate differently.

FIG. 10 also illustrates another embodiment of the lid support structure 140a, 140b, which includes a pair of tracks 142a, 142b at the opposing ends of the slots 135a, 135b. Each of the tracks 142a, 142b has a back wall and a pair of side walls that define a channel 143a, 143b similar to the channel 43 of the first embodiment (FIG. 7). However, in this embodiment, the travel of the lids 114a, 114b in the tracks 142a, 142b is limited by a stop 145a, 145b that extends from the back wall and across the open end of the channel 143a, 143b.

Figure 12:
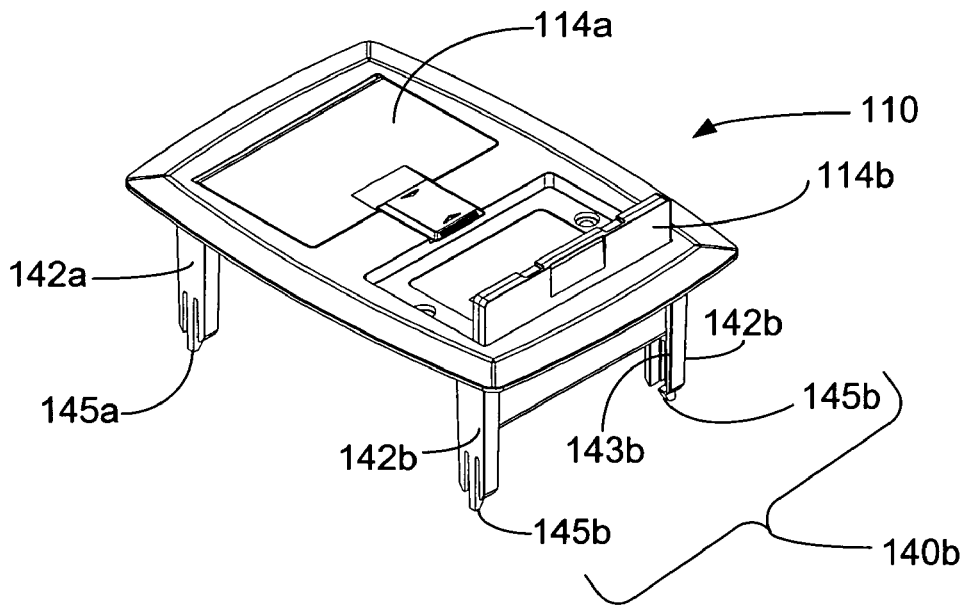
FIG. 12 is a front perspective view of the cover in FIG. 10 with one of the hide-away lids in the partially retracted position.
Figure 13:
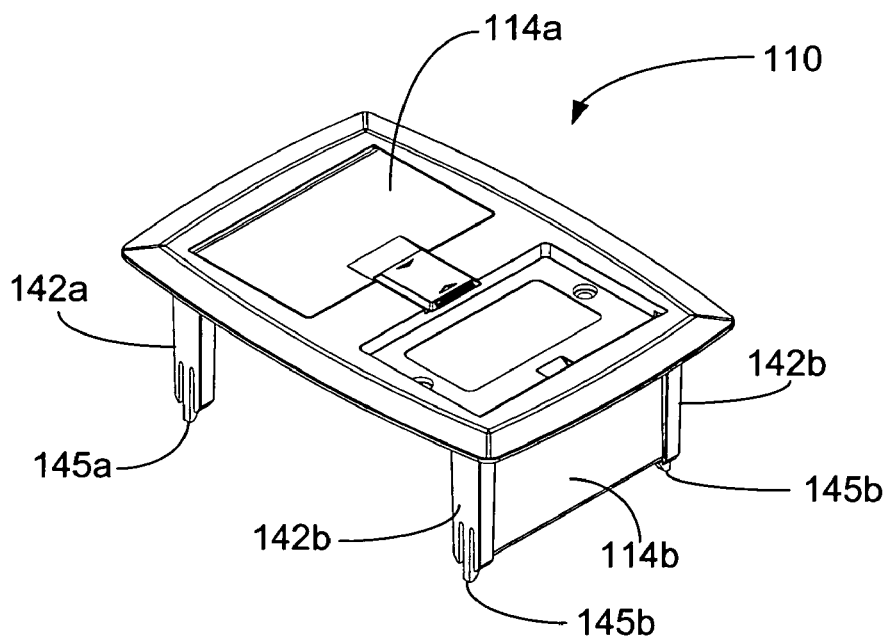
FIG. 13 is a front perspective view of the cover in FIG. 10 with one of the hide-away lids in the fully retracted position.

FIG. 11 shows the dual lid cover 110 with one of the lids 114b in a partially open position, which allows access to one of the openings 113b in the cover 110. In FIG. 12, one of the lids 114b is partially retracted into the cover 110 and in FIG. 13, the lid 114b is fully retracted into the cover 110. In this position, the stops 145b at the bottom of the tracks 142b prevent the lid 114b from traveling any further. However, if the lid 114b needs to be removed from the cover 110, the stops 145b can be moved outwardly so that the lid 114b can slide out of the tracks 142b.

Figure 14:
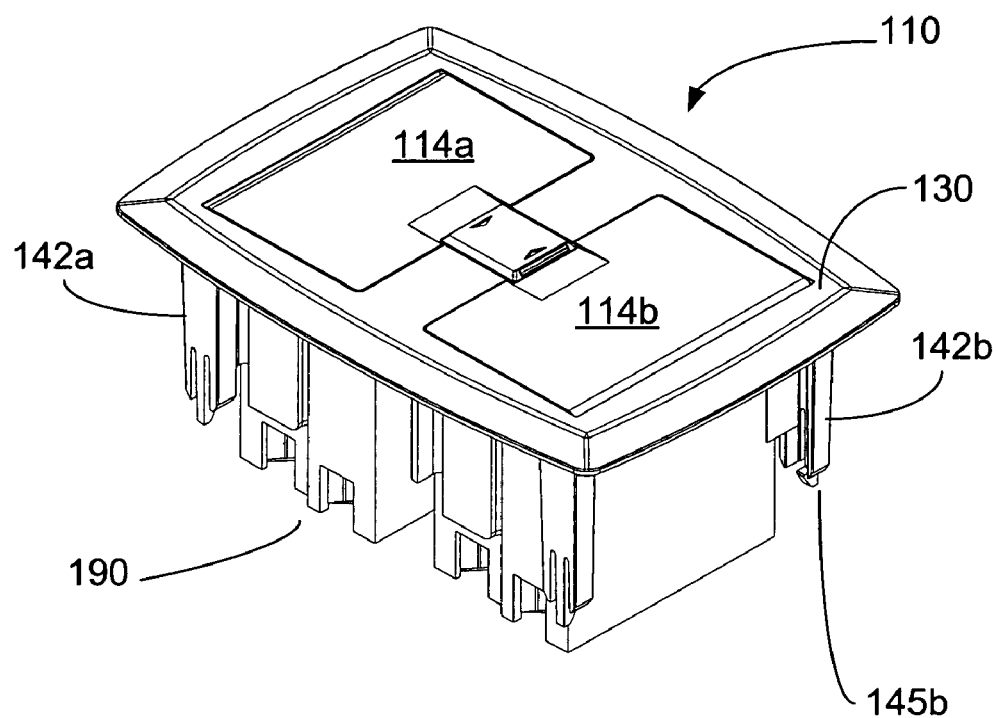
FIG. 14 is a front perspective view of the cover in FIG. 10 mounted on a dual electrical box and with the hide-away lids in the closed position.
Figure 15:
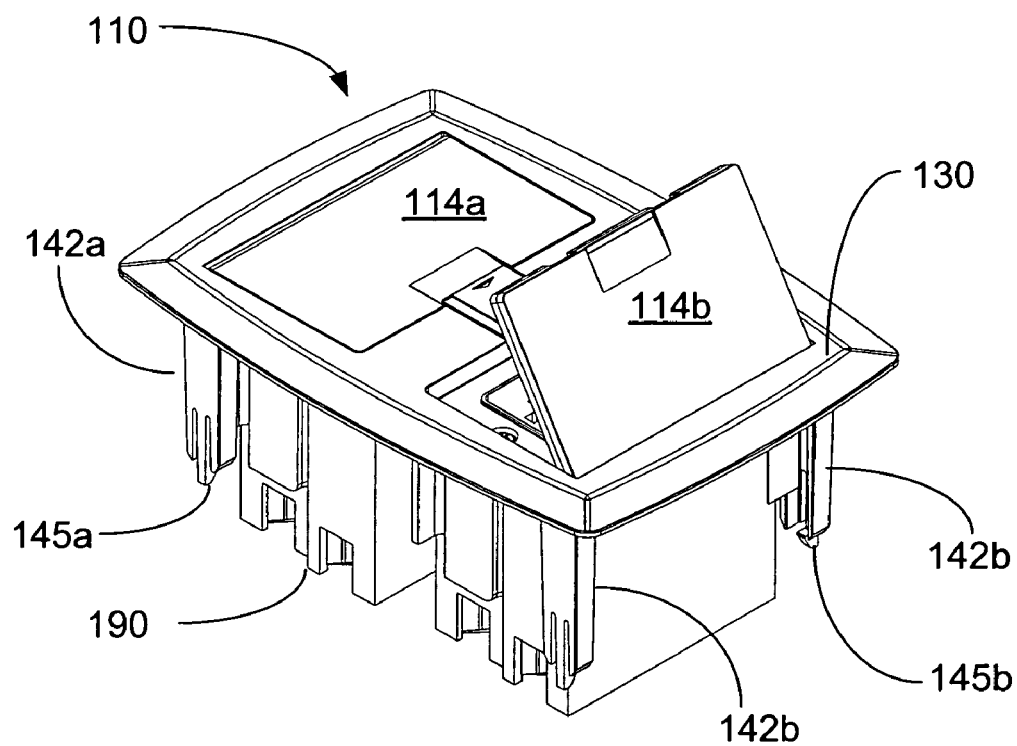
FIG. 15 is a front perspective view of the cover in FIG. 10 mounted on a dual electrical box and with one of the hide-away lids in the partially open position.
Figure 16:
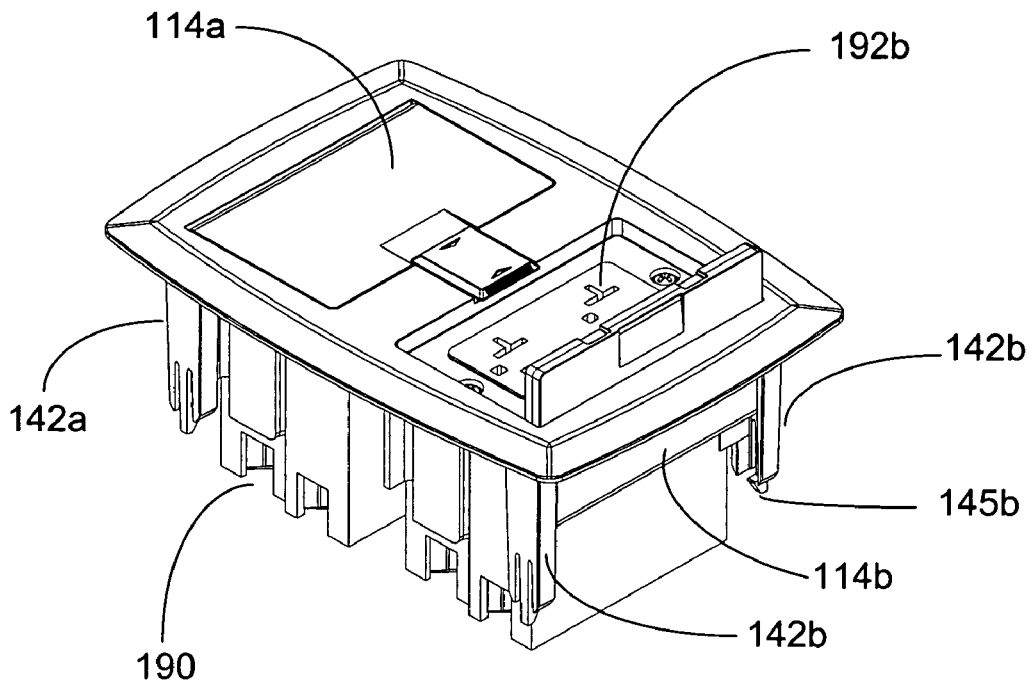
FIG. 16 is a front perspective view of the cover in FIG. 10 mounted on a dual electrical box and with one of the hide-away lids in the partially retracted position.
Figure 17:
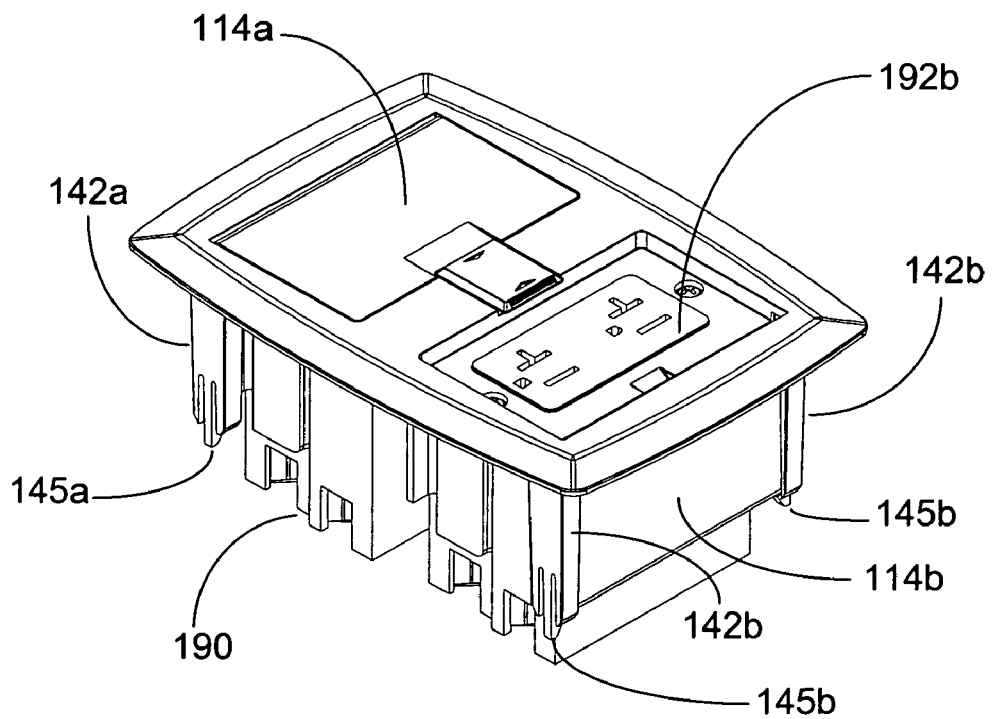
FIG. 17 is a front perspective view of the cover in FIG. 10 mounted on a dual electrical box and with one of the hide-away lids in the fully retracted position.

FIGS. 14-17 show the dual lid cover 110 on a dual electrical box 190 with the lids 114a, 114b in different positions. The dual electrical box 190 houses two electrical devices 192b (FIG. 16—only one shown) and the dual lid cover 110 provides lids 114a, 114b for individual access to the devices 192b. FIG. 14 shows both lids 114a, 114b in the closed position, FIG. 15 shows one lid 114a in the closed position and the other lid 114b partially open. FIG. 16 shows one lid 114a in the closed position and the other lid 114b partially retracted into the tracks 142b and FIG. 17 shows one lid 114a in the closed position and the other lid 114b fully retracted into the tracks 142b.

While select preferred embodiments of this invention have been illustrated, many modifications may occur to those skilled in the art and, therefore, it is to be understood that these modifications are incorporated within these embodiments as fully as if they were fully illustrated and described herein. For example, the electrical box cover according to the present invention may be attached to various types and designs of electrical and electronic component boxes. These boxes may include the typical electrical box for electrical outlets and switches and may also include boxes or even open frames for electronic components such as connectors for media data cables such as Ethernet, dvi, hdmi, optical audio and co-axial.

What is claimed is:

1. A cover for an electrical box, wherein the electrical box has a back wall, an open front and a perimeter side wall extending therebetween to define a box interior which is adapted to receive one or more electrical devices, the cover comprising: a face plate having a front, a back, an opening with a plurality of sides, a surface and a recessed ledge in the surface on a first side of the plurality of sides; an elongate slot in the face plate substantially parallel to and extending along one side of the opening between the recessed ledge and the first side, wherein the slot has a pair of opposing sides and a pair of opposing ends; a lid support structure extending from the back of the face plate proximate the slot; and a lid comprising a first end, a second end and a pair of opposing sides, wherein the lid fits on the front of the face plate and over the opening and is pivotably movable between an open position, which allows access to the box interior, and a closed position, which prevents access to the box interior, and wherein the lid is slidably receivable by the slot when in the open position.

2. The electrical box cover according to claim 1, wherein the lid support structure comprises two retainers and each retainer has a terminus formed by a tab, and wherein the tabs face each other and limit the movement of the lid.

3. The electrical box cover according to claim 1, wherein the lid support structure comprises a pair of tracks located at the opposing ends of the slot.

4. The electrical box cover according to claim 1, wherein the lid support structure comprises a pair of channels located at the opposing ends of the slot, wherein each channel has a closed end formed by the face plate and an open end.

5. The electrical box cover according to claim 4, wherein the lid further comprises a pin on each of the opposing sides of the lid, wherein the pins are slidably received by the channels and wherein the lid pivots on the pins between the open and closed positions.

6. The electrical box cover according to claim 5, wherein the lid support structure further comprises two retainers located on the opposing sides of the slot, wherein the two retainers each have a terminus formed by a tab, and wherein the tabs face each other and limit the movement of the lid in the support structure.

7. The electrical box cover according to claim 5, wherein a stop extends across each of the open ends of the channels to limit the movement of the lid in the channels.

8. The electrical box cover according to claim 1, wherein the recessed ledge in the surface is on at least two sides of the opening.

9. The electrical box cover according to claim 8, wherein the lid contacts the recessed ledge when in the closed position.

10. The electrical box cover according to claim 1, wherein the first end of the lid has a latching device that engages the face plate on the side of the opening opposite the slot and the second end of the lid is slidably receivable by the slot.

11. A cover for an electrical box, wherein the electrical box has a back wall, an open front and a perimeter side wall extending therebetween to define a box interior that is adapted to receive one or more electrical devices, the cover comprising: a face plate having a front, a back, a surface and two or more openings, wherein each opening has a plurality of sides and a recessed ledge in the surface on a first side of the plurality of sides; two or more elongate slots in the face plate, each elongate slot substantially parallel to and extending along one side of one of the openings between the recessed ledge and the first side, wherein each slot has a pair of opposing sides and a pair of opposing ends; two or more lid support structures, each lid support structure extending from the face plate proximate one of the slots; and two or more lids, each comprising a first end, a second end and a pair of opposing sides, wherein each of the lids fits over one of the openings and is pivotably movable between an open position, which allows access to the box interior, and a closed position, which prevents access to the box interior, and wherein each lid is slidably receivable by one of the slots when in the open position.

12. The electrical box cover according to claim 11, wherein each of the lid support structures comprises two retainers and each retainer has a terminus formed by a tab, and wherein the tabs face each other and limit the movement of the lid.

13. The electrical box cover according to claim 11, wherein each of the lid support structures comprises a pair of tracks located at the opposing ends of one of the slots.

14. The electrical box cover according to claim 11, wherein each of the lid support structures comprises a pair of channels located at the opposing ends of one of the slots, wherein each channel has a closed end formed by the face plate and an open end.

15. The electrical box cover according to claim 14, wherein each of the lids further comprises a pin on each of the opposing sides of said each lids, wherein the pins are slidably received by the channels and wherein the lids pivot on the pins between the open and closed positions.

16. The electrical box cover according to claim 15, wherein each of the lid support structures further comprises two retainers located on the opposing sides of one of the slots wherein the two retainers each have a terminus formed by a tab, and wherein the tabs face each other and limit the movement of the lid in the support structure.

17. The electrical box cover according to claim 15, wherein a stop extends across each of the open ends of each of the channels to limit the movement of each of the lids in one of the channels.

18. The electrical box cover according to claim 11, wherein each of the recessed ledges in the surface is on at least two sides of each of the two or more openings in the cover.

19. The electrical box cover according to claim 11, wherein the first end of each lid has a latching device that engages the side of one of the openings opposite one of the slots, and wherein the second end of each lid is slidably receivable by one of the slots.

20. A cover for an electrical box, wherein the electrical box has a back wall, an open front and a perimeter side wall extending therebetween to define a box interior which is adapted to receive one or more electrical devices, the cover comprising: a face plate having a front, a back, an opening with a plurality of sides, a surface and recessed ledge in the surface on a first side of the plurality of sides; an elongate slot in the face plate substantially parallel to and extending along one side of the opening between the recessed ledge and the first side, wherein the slot has a pair of opposing sides and a pair of opposing ends; a lid support structure extending from the face plate proximate the slot, wherein the lid support structure comprises a pair of channels located at the opposing ends of the slot and two retainers located on the opposing sides of the slot, wherein the two retainers each have a terminus formed by a tab, wherein the tabs face each other; and a lid comprising a first end, a second end, a pair of opposing sides and a pin on each of the opposing sides, wherein the first end of the lid has a latching device that engages one of the sides of the opening in the face plate, wherein the lid fits over the opening and pivots on the pins between an open position, which allows access to the box interior, and a closed position, which prevents access to the box interior, wherein the second end of the lid is slidably receivable by the slot when in the open position, and wherein the lid support structure is adapted to receive the lid and the tabs on the retainers are adapted to limit the movement of the lid in the support structure.

* * * * *